(12) United States Patent
Berger et al.

(10) Patent No.: US 9,123,085 B2
(45) Date of Patent: Sep. 1, 2015

(54) OPTIMIZING THE PERFORMANCE OF AN IMAGE EDITING SYSTEM IN A CLIENT-SERVER ENVIRONMENT

(75) Inventors: Ralf Berger, Acton, MA (US); Steve M. Troppoli, Carlisle, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/480,307

(22) Filed: May 24, 2012

(65) Prior Publication Data
US 2015/0213625 A1 Jul. 30, 2015

Related U.S. Application Data

(63) Continuation of application No. 12/190,358, filed on Aug. 12, 2008, now Pat. No. 8,208,762.

(51) Int. Cl.
*G06K 9/54* (2006.01)
*G06T 1/00* (2006.01)

(52) U.S. Cl.
CPC ........................................ *G06T 1/00* (2013.01)

(58) Field of Classification Search
None
See application file for complete search history.

(56) References Cited

U.S. PATENT DOCUMENTS

| | | | |
|---|---|---|---|
| 6,166,729 A | 12/2000 | Acosta et al. | |
| 6,298,446 B1 | 10/2001 | Schreiber et al. | |
| 6,522,418 B2 | 2/2003 | Yokomizo et al. | |
| 7,065,249 B2 | 6/2006 | Fushiki et al. | |
| 7,199,901 B2 * | 4/2007 | Watanabe et al. | 358/1.9 |
| 7,269,303 B2 | 9/2007 | Miller et al. | |
| 2002/0029242 A1 * | 3/2002 | Seto | 709/203 |
| 2002/0164059 A1 * | 11/2002 | DiFilippo et al. | 382/128 |
| 2003/0105795 A1 * | 6/2003 | Anderson et al. | 709/101 |
| 2004/0008226 A1 * | 1/2004 | Manolis et al. | 345/769 |
| 2004/0170316 A1 * | 9/2004 | Saquib et al. | 382/162 |
| 2005/0104894 A1 | 5/2005 | Sanborn et al. | |
| 2007/0260979 A1 * | 11/2007 | Hertzfeld et al. | 715/530 |
| 2008/0285892 A1 | 11/2008 | Sposato et al. | |
| 2009/0013036 A1 * | 1/2009 | Kim et al. | 709/203 |
| 2009/0110326 A1 * | 4/2009 | Kim et al. | 382/276 |

OTHER PUBLICATIONS

"PhotoFinish® User's Guide" ZSoft, WordStar Atlanta Technology Center, Inc., 1993, pp. 68-69.*

* cited by examiner

*Primary Examiner* — Jon Chang
(74) *Attorney, Agent, or Firm* — Kilpatrick Townsend & Stockton LLP (57) ABSTRACT

Various embodiments of a method and system for an image editing system are disclosed. A client-side image editor may receive a copy of an image from a network-based server. The image may have previously been uploaded to the network-based server for storage purposes. The client-side image editor transforms the image, or proxy image, according to one or more image transformation operations. The client-side image editor maintains an edit list, including an ordered list of transformation operations performed on the image. In response to a "Save" operation, the client-side image editor sends the edit list to the network-based server. The altered image is not be sent. The network-based server receives the edit list and may apply the transformations to the original image. Since the edit list is very small relative to the altered image, sending the edit list to the network-based client reduces the time required for a "Save" operation.

20 Claims, 5 Drawing Sheets

OPTIMIZING THE PERFORMANCE OF AN IMAGE EDITING SYSTEM IN A CLIENT-SERVER ENVIRONMENT

This application is a continuation of U.S. application Ser. No. 12/190,358 now U.S. Pat. No. 8,208,762, filed Aug. 12, 2008, which is hereby incorporated by reference in its entirety.

BACKGROUND

Image-editing is the process of altering, manipulating, enhancing and transforming digital images. Image-editing software may be broadly grouped into vector graphics editors, raster graphics editors and 3d modelers. Image-editing programs may be used to render or create digital images.

Image editors, such as Adobe Photoshop Express™, change pixel information in order to enhance the image. Pixels may be changed as a group or individually by transformation operations executed by the image editor.

In a client-server environment, an image editor may reside on a network-based client system, and transformations may be made on the client system. When the image editor saves the altered image after an edit session, the image editor may compress the rendered image and send the image to a network-based server for storage. This upload of the image to the server may be very time consuming, especially for large images.

SUMMARY

Various embodiments of methods and systems for storing digital images in a client-server environment are disclosed. A client-side image editor may transform an image into an updated image according to input received from a user. Transforming, as described herein, is defined as performing one or more transformation operations on the image. Example transformation operations include sharpening the image, softening the image, cropping the image, etc.

The client-side image editor generates an edit list including a list of the transformation operation(s) performed on the image. The edit list may include an identifier for each transformation operation in the order in which the transformation operation was performed. The client-side image editor may perform a "Save" operation and send the edit list (without the altered image) to a network-based server. Typically, the edit list is very small in comparison to the altered image.

The network-based server receives the edit list from the client-side image editor. In some cases, the image located on the client-side image editor is a copy of an original image; the original image is located on the network-based server. Subsequent to receiving the edit list, the network-based server may transform the original image according to the transformation operations described in the edit list.

While variations are described herein by way of example for several embodiments and illustrative drawings, those skilled in the art will recognize that embodiments is not limited to the examples or drawings described. It should be understood, that the drawings and detailed description thereto are not intended to limit the embodiments to the particular form disclosed, but on the contrary, embodiments are to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in the permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A method and system for optimizing the performance of an image editor in a client-server environment is described herein. An image editor is defined as a program, or collection of program components running on one or more computing devices that enable a user to view and manipulate digital images. Due to the popularity of digital cameras, image editors are widely used to perform operations on digital images, such as rotating, cropping and selectively changing colors. Many other operations are possible.

Figure 1:
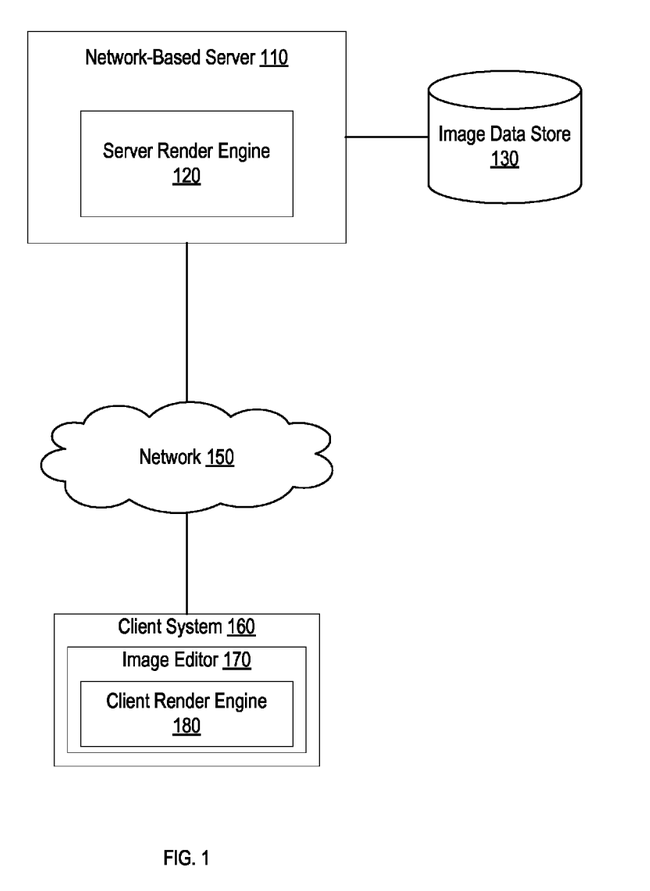
FIG. 1 is a block diagram illustrating an image editing system, according to some embodiments.

FIG. 1 is a block diagram illustrating an image editing system in a client-server environment, according to some embodiments. In a client-server environment, image editor 170 may receive a copy of an image from network-based server 110. (The original image may have previously been uploaded to network-based server 110.) Image editor 170 may edit or transform the image. For example, image editor 170 may perform a "Sharpen" transformation operation at an adjustment value of 30% for a particular image. Image editor 170 maintains an edit list of transformation operation(s) performed on the image. In this example, the edit list may contain an indication of "Sharpen" with a parameter of "30%".

The edit list may be maintained separate from image. Client render engine 180 performs the transformation operations described in the edit list to the image and subsequently displays the altered image. In the case where multiple transformations are performed on the image, the edit list indicates each transformation. In some embodiments, the edit list may also indicate an order for the transformations. The edit list may be very small in comparison to the size of the image. (See the discussion below for FIG. 2B for a more detailed description of the edit list.)

Subsequent to transforming the image, image editor 170 may execute a "Save" operation, and image editor 170 sends the edit list (without the image) to network-based server 110. Saving the edit list to network-based 110 rather than saving the entire image results in greater performance in a client-server environment because sending the edit list (small) to network-based server 110 takes less time than sending the altered image (large). After receiving the edit list, server render engine 120, located on network-based server 110, may apply the transformations in the edit list to the original image located on image data store 130, thus rendering the same image as the transformed image located on client system 160.

The transformed image generated by server render engine 120 may be stored in image data store 130 for later reference by other applications or by client system 160.

As shown in FIG. 1, image editor 170 resides on client system 160. Client system 160 may be implemented as any computing device configured to execute program instructions and display images on a display device. Client system 160 may be implemented as a laptop computer, desktop computer, server, tablet computing device, video game console, personal digital assistant (PDA), digital camera or cell phone. Other computing devices have been contemplated.

Client system 160 may be configured with an operating system. The operating system may be configured to interact with image editor 170 in order to manage resources such as exchanging data with digital cameras, receiving user input, managing files (e.g., digital images) and communicating with other computing devices (e.g., network-based server 110) via network 150. Example operating system implementations include Linux, Mac OS X™, Microsoft™ Windows™, and Solaris™.

Image editor 170 is configured to manipulate the pixel and color space information for one or more images. Example implementations of image editor 170 include Adobe Photoshop™ and Adobe Photoshop Express™. Image editor 170 may execute various transformation operations on a digital image in order to change the appearance of the image.

Image editor 170 is configured to display various menus and other controls that allow a user associated with client system 160 to select a desired transformation operation. Some transformation operations may be associated with pre-defined adjustment levels. Other transformation operations may be based on a range of adjustments that may be adjusted from a minimum value to a maximum value. In some embodiments, image editor 170 sets adjustment values to a point within the range.

Image editor 170 may be integrated with, or be part of a network-enabled application (e.g., web browser). In one embodiment network-enabled application 170 may be integrated with Adobe Flash™. In other embodiments image editor 170 may be implemented as an Active-X™ component or another suitable component. Image editor 170 may be written in a scripting language and compiled into byte code or downloaded from a web site (e.g., embedded in a web page) and invoked by client system 160 when received.

In some embodiments, image editor 170 may be written in a procedural language, such as C or C++ and compiled into an executable program. Image editor 170 may be written in an object oriented language, such as Java™ or C#™ and execute in conjunction with a virtual machine (Java Virtual Machine (JVM)) or a framework, such as .NET™ or J2EE™. In some cases, image editor 170 may be downloaded from a server or installed from media such as CD-ROM or DVD.

Image editor 170 may read and write image data locally on client system 160, such as a storage device. Storage device implementations may include one or more disk drives or non-volatile memory storage. In some embodiments, image editor 170 transfers images to and from image data store 130, located on, or connected to network-based server 110. In some embodiments, image editor 170 receives images from a camera device and sends the images to network-based server 110, which stores the images on image data store 130.

A digital camera may take video or still photographs or both. Many digital cameras record sound and moving video as well as still photographs. The methods and systems described herein may apply to digital data for still images, video images, or any combination thereof.

Digital images may be defined as a color scale image or a gray scale image. A gray scale image is an image in which the value of each pixel includes information about its intensity, composed exclusively of a shade of neutral gray varying from black at the lowest intensity to white at the strongest. Gray pixels usually have equal values in RGB. For example, a light gray may have the composite value of (240, 240, 240) and a dark gray may have the composite value of (40, 40, 40). The colors of pixels in an image may be defined in a color space representation other than RGB, such as Hue, Saturation and Lightness (HSL), or Hue, Saturation and Value (HSV).

The pixel data of an image may be compressed and stored in a particular format. Many image file formats use data compression to reduce file size and save space. Digital compression of images may take place in a camera or on a computing device or in image editor 170. One standard file format for storing digital image information is the Joint Photographic Experts Group format (JPEG). The JPEG standard specifies the codec, which defines how an image is compressed into a stream of bytes and decompressed back into an image. The JPEG standard also defines the file format used to contain the stream.

Image files that utilize the JPEG compression standard are commonly called, "JPEG files". The most common filename extensions for files employing JPEG compression are .jpg and .jpeg. JPEG is described herein as an example. The methods and systems described herein are not file format specific. Many other file formats are possible.

In various embodiments, network 150 may be configured to allow data to be exchanged between client system 160 and other devices connected to network 150, such as network-based server 110. Network 150 may correspond to various methods of communication between entities and may include, but is not limited to communication via the Internet, telephone, fax, email, messages (e.g., instant messaging), voice messages, and electronic documents (e.g., web page, email or file transfers). In general, network 150 may represent any method that one entity may utilize to communicate with another entity. While network 150 may be illustrated in a generalized manner, one of ordinary skill in the art will recognize that network 150 is meant to be representative of a complete communication path between the entities depicted in FIG. 1 with a specific type of communication channel. For example, network 150 may represent one or more communications channels and may include one or more telecommunications networks as well as various data networks. Network 150 may include network devices such as circuits, switches, routers, hubs and/or gateways. Network 150 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol. Data may be transmitted on network 150 using Hyper Text Transport Protocol (HTTP), Secure Hyper Text Transport Protocol (HTTPS), Secure Socket Layer Protocol (SSL), Transport Layer Security Protocol (TLS) or another suitable network transport protocol. In various embodiments, the services described herein may utilize any suitable compression protocol or cryptographic protocol when communicating over network 150.

Network-based server 110 may be implemented as any computing system configured to connect to network 150 and communicate with client system 160. In some embodiments, network-based server 110 is implemented as a web server. Network-based server 110 may service requests from one or more client systems 160. Network-based server 110 may be configured to listen on a port (e.g., port 80) waiting for client system 160 to send a request message, such as for an image file stored in image data store 140. When network-based server 110 receives a request, it may be configured to fetch content (e.g., web content or image file) and forward the content to client system 160. Network-based server 110 may be implemented as one or more physical systems connected to one or more storage devices. Network-based server 110 may be configured to run special web server software to service client system requests. Example web server software includes Microsoft™ Internet Information Systems™ and Apache™. Other server host application software is possible. In some embodiments, network-based server 110 may provide web services or may be implemented as an application server.

Network-based server 110 may be configured to store digital images on image data store 130. In some embodiments, image data store 130 may be implemented as a digital library, which may store collections of digital images accessible by network-based server 110. Network-based server 110 may manage Image data store 130. Network-based server 110 may make the images available to a community of users. In some embodiments, network-based server may control access to the images. For example, only users with the proper security credentials may access certain images on image data store 130.

In some embodiments, image data store 130 may be implemented as one or more disk devices, such as a RAID array (Redundant Arrays of Independent Disks). In other embodiments, image data store 130 may be implemented as one or more Network Attached Storage (NAS) devices, one or more Storage Area Network (SAN) devices, disk arrays, tape libraries, optical jukeboxes or another suitable storage device for storing digital images.

Images may be stored on image data store 130 when client system 160 uploads the image to network-based server 110. For example, a user may take digital photos with a camera device and connect the device to client system 160. Image editor 170 may be configured to receive the images from the camera device and upload the images to network-based server 110, which may store the original images on image data store 130. Subsequently, client system 160 may download, display and edit the images as described in the description below for FIG. 2A.

Figure 2A:
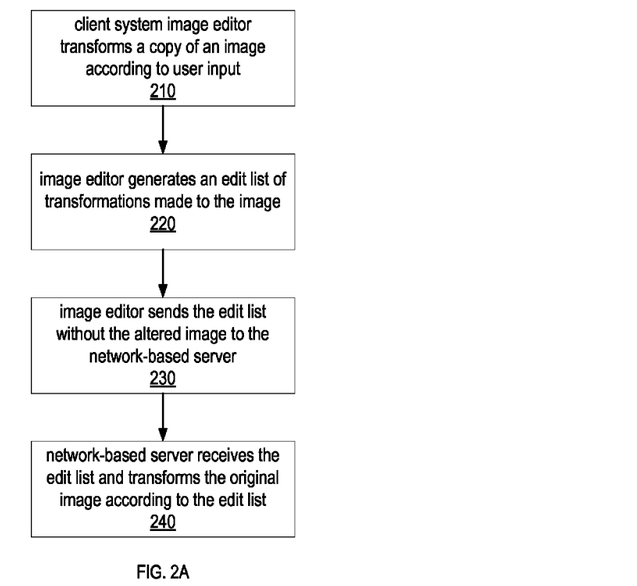
FIG. 2A is a flow diagram illustrating an image editor retrieving an image, editing the image and saving changes in the form of an edit list to a network-based server, according to some embodiments.

FIG. 2A is a flow diagram illustrating an image editor, transforming the image and saving a record of changes made to the image in the form of an edit list, according to some embodiments. Image editor 170 may transform or edit an image as shown in block 210. Example transformations include cropping the image, rotating the image, changing the exposure, changing the saturation, sharpening the focus, softening the focus and converting the image from color to black and white. Many other transformations are possible. The image located on client system 160 may be a copy of an original image, received from network-based server 110. For example, image editor 170 may retrieve a copy of an image previously uploaded to network-based server 110.

As shown in block 220, image editor 170 generates an edit list of transformations made to the copy of the original image. The edit list includes a historical record of each transformation with any corresponding parameters. A transformation may include zero, one or more parameters. Parameters may be stored in the form of a numeric value, a percentage value or another suitable form. The edit list may contain a description of one or more transformation operations and any parameters associated with each transformation operation. Client render engine 180 applies the transformations included in the edit list to the copy of the original image and display the altered image on a display device.

As shown in block 230, image editor 170 may execute a "Save" operation to save the altered image. In this case, image editor 170 sends the edit list to network-based server 110. The edit list may identify the image to which it applies, or a separate image ID may be sent with the edit list. In response to the "Save" operation, the corresponding altered image itself (rendered on the client system 160) is not sent from client system 160 to network-based server 110. The edit list is typically smaller than the altered image. Thus, transferring the relatively small edit list to network-based server 110 takes a shorter time interval than transferring the relatively large image.

As shown in block 240, network-based server 110 receives the edit list. In some cases, after receiving the edit list network-based server 110 may send an acknowledgement back to the image editor, indicating the edit list has been received. Subsequently, network-based server 110 may transform the original image according to the edit list. In some embodiments, network-based server 110 may schedule an image update with server render engine 120 and server render engine 120 may read the edit list and transform the original image according to the transformation information included in the edit list.

The image on the client may be rendered immediately, however, the server may schedule the transformation of the original image at a later time (e.g., according to workload) independent of when the image is rendered on the client. For example, when the workload is light, server render engine 120 may transform the original image immediately after receiving the edit list. In other cases the transformation may be delayed due to workload, performance reasons, etc. The transformed image generated by server render engine 120 may be stored in image data store 130 for later reference by other applications or by client system 160.

In some embodiments, the image to which the transformations from the edit list are applied on the server may be of a higher resolution than the version of the image on the client system to which the transformations were originally applied. In some embodiments there may be several versions of the same image in data store 130 at different resolutions, and the transformations from the edit list may be applied to all the versions of the image. For example, there may be five copies of an image and each copy may be of a different resolution. In this case server render engine 120 may be configured to apply the edits included in the one edit list received from client system 160 to all five copies in a batch operation. In another embodiment, the server render engine 120 may apply the edits included in the edit list to the original high-resolution image, and that image may then be downsampled to create multiple additional versions of the image on the server, each at a different lower resolution.

In another embodiment, server render image 120 may apply the same edit list to several different images. For example, there may be several different images taken under similar conditions (e.g., in the same or similar lighting conditions). In this case the user may perform one or more transformations on one of the images on the client system. The client may "save" the changes which results in the corresponding edit list, but not the image, being sent to the server. The user may also specify other images on the server for the same edit list to be applied to. Server render engine 120 may then apply the same edit list to all of the specified images in a batch operation.

Figure 2B:
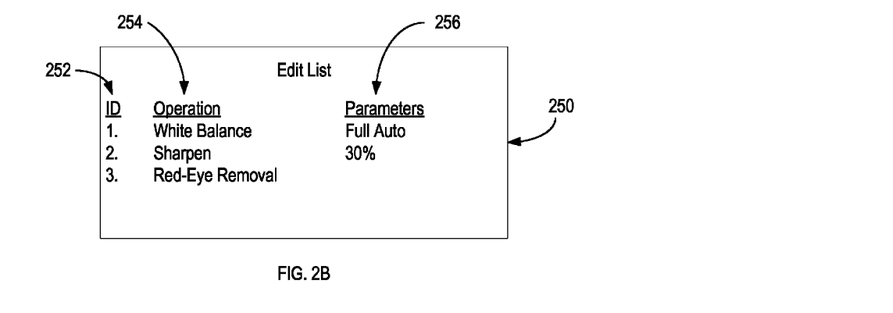
FIG. 2B is a block diagram illustrating an example of an edit list, according to some embodiments.

FIG. 2B is a block diagram illustrating an example of an edit list, according to some embodiments. As described above, the edit list comprises a list of all transformation operations performed on an image. Item 250 in FIG. 2B is an example of an edit list. Item 252 illustrates an ID column, which provides a numeric value designating the order in which the transformation operations are performed. Item 254 illustrates the Operation column, which provides a description of the operation being performed. In some embodiments, the operation may be defined as a text string. In other embodiments, the operation may be defined by a numeric value or another indication of a transformation operation. Item 256 provides an illustration of parameter values associated with the transformation operation. Some transformation operations may not require a parameter. Other transformation operations may require one or more parameters. Parameters may be defined as text strings or numeric values.

In various embodiments, edit lists may include other fields, such as an image file name, the user name of the user that owns the image, the user name of the last person to modify the image and the name of the server where the image is stored. FIG. 2B is provided as an example of an edit list. In various embodiments, some of the fields shown in FIG. 2B may be omitted and other fields may be added.

The edit list may be formatted as a text file, an XML file, or another suitable file format. In some cases, fields may be designated with tags. In other cases, fields may set at a fixed length.

Figure 3:
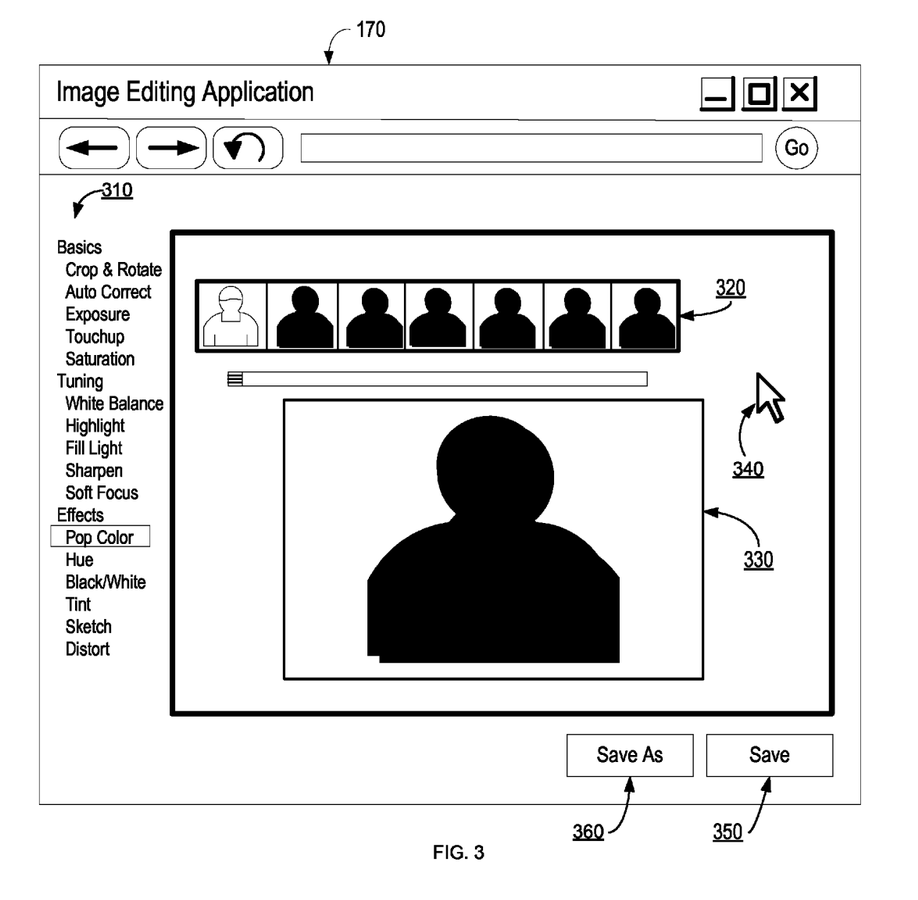
FIG. 3 is an illustration of an image editor user interface, according to some embodiments.

FIG. 3 is an illustration of an image editor user interface, according to some embodiments. The objects illustrated in FIG. 3 are examples. The arrangements of the displayed items in FIG. 3 are provided for description purposes only and are not meant to limit the items displayed or the manner in which they are displayed. Items in the figures may be rearranged or omitted altogether. Other items may be displayed in actual various embodiments.

As described above, in some cases image editor 170 may be configured to execute within a web browser. Item 170 within FIG. 3 is an example of one such implementation.

Item 310 may include one or more menu items of available transformation operations. Each menu item shown at item 310 may be associated with one or more transformation operations that may be executed on the image data. Some transformation operations may correspond to a range of adjustment values (e.g., from a minimum level to a maximum level). Below is a partial list of transformation operations:
Crop & Rotate—Turn the image, straighten the image, crop out the background.
Auto Correct—Lighting and contrast adjustment.
Exposure—Change the brightness of the image.
Red-Eye Removal—Removes red eyes caused by some camera flashes.
Touchup—Remove scratches and other imperfections.
Saturation—Make the colors brighter or dampen the colors down to black and white.
White Balance—Adjust the type of lighting in the image.
Highlight—The brightest parts of an image are the highlights. This transformation brightens or darkens just the brightest part of the image.
Fill Light—Fill Light brightens the dark area of an image without over-brightening the background.
Sharpen—Makes the image appear more in focus.
Soft Focus—Makes the image appear with a subtle blur for artistic effect.
Hue—Changes all the colors in a photo at once.
Black & White—Control how the colors are converted when changing an image to black and white.
Tint—Change various colors, for example change black and white to red and white.
Sketch—Makes an image appear as if it were drawn.
Distort—Stretch, twist, bulge specific areas of the image.

Image editor 170 may display various controls and image objects used to help the user understand the effects of the transformation operations. Image editor 170 may display an image, as shown at item 330. As shown at items 320, image editor 170 may display a group of two or more thumbnail images. In this example, seven thumbnail images 320 of the original image 330 are displayed. Each thumbnail image 320 is displayed with a different transformation adjustment value. The user associated with image editor 170 may select the transformation operation and the adjustment value to apply to image 330.

As transformations are made using image-editing application 170 on client system 160, the image may be re-rendered by client rendering engine 180 to show the effect of the transformation and the edit list may be updated. After altering the image, image editor 170 may save the image. The save operation may be executed when image editor 170 receives notification that button 360 or button 350 is selected. Button 350 is the "Save" button and button 360 is the "Save As" button. When image editor 170 saves the image, the edit list is sent to network-based server 110 without sending a copy of the corresponding rendered image.

After pressing the "Save" button, the user may continue to edit or view the transformed image while the server schedules the update of the original image. The client already has the altered image and does not have to wait for the server to update the original image. For example, the server may be delayed due to a heavy workload. Note that the image is rendered on the client independent of when the image is rendered on the server.

In some cases, image editor 170 may have a maximum image size limitation and the image located on image data store 130 may be larger than this limitation. In this case, the higher resolution image on data store 130 may be downsampled to a size image editor 170 can work with. When the image is "saved" after an edit session, the edit list is sent to network-based server 110 and server render engine 120 applies the edit list to the original (e.g., higher resolution) image. Image editor 170 does not have to work on an image that is the same size as the original image stored on image data store 130.

Figure 4:
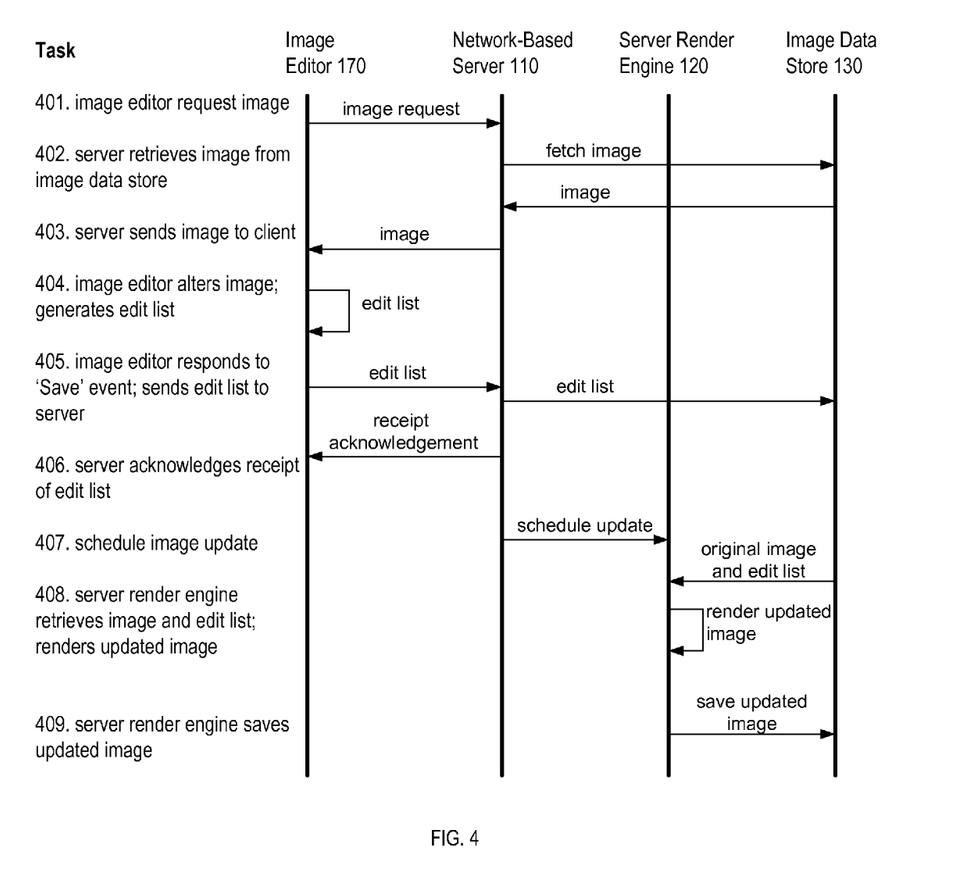
FIG. 4 is a transition diagram illustrating an image editor saving an image to a network-based server, according to some embodiments.

FIG. 4 is a transition diagram illustrating an image editor saving an image to a network-based server, according to some embodiments. As shown at item 401, image editor 170 requests an image. In some embodiments, image editor 170 sends a request for the image from client system 160 to network-based server 110. Network-based server 110 may fetch a copy of the image from image data store 130, as shown at item 402. (Note that the original image may have previously been uploaded to image data store 130.) After fetching the image, network-based server 110 sends the image to client system 160 and image editor 170 as shown at item 403. In some embodiments, network-based server 110 may downsample the image and send the downsampled image to image editor 170 for edits. For example, client system 160 may not be configured to display a large image and may require a smaller image for display purposes, or for performance purposes.

After receiving the image, image editor 170 may display the image, and image editor 170 may transform the image as shown at item 404. As described above, image editor 170 or client render engine 180 maintains an edit list of image transformation operations and parameter values. The parameter values may be implemented as numeric values, percentages or some other suitable format. Client render engine 180 renders (e.g., apply the transformations to the image) and display the image on a display device connected to client system 160.

Image editor 170 may respond to a "Save" event (e.g., "Save" button key-press) as shown in block 405. Instead of sending the entire image to network-based server 110, image editor 170 sends the edit list to network-based server 110. In some embodiments, image editor 170 may compress the edit list prior to sending it. Network-based server 110 receives the edit list and may save the edit list to image data store 130. Network-based server 110 may send a receipt acknowledgement to image editor 170 after the edit list has been received, as shown in block 406. Network-based server 110 may schedule an image update with server render engine 120 as shown in block 407.

Server render engine 120 retrieves the edit list and the original image from image data store 130 and applies the transformation operations included in the edit list to the original image as shown in block 408. In some cases, the parameters in the edit list may be adjusted based on the size of the copy of the original image (i.e., proxy image) edited by the client, or based on the size of the image at the server relative to the size of the proxy image. For example, the proxy image may be a downsampled copy of the original image located on the server. A parameter that applies to the smaller proxy image may need to be adjusted to have the same effect on the larger original image.

By applying the transformations to the original image on image data store 130, the original image will appear the same as the transformed image on client system 160. Subsequently, server render engine 120 saves the transformed image to image data store 130 as shown in block 409.

Figure 5:
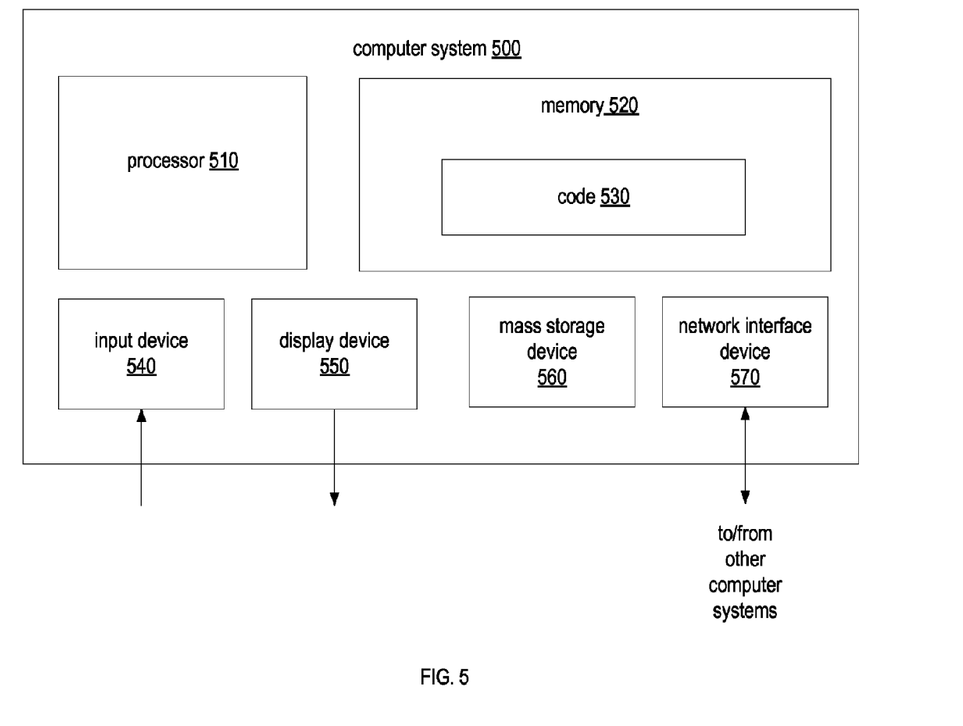
FIG. 5 is a block diagram illustrating a computing device, according to some embodiments.

FIG. 5 is a block diagram illustrating a computing device, according to some embodiments. Various components of embodiments of client system 160 and network-based server 110 and nodes, etc., as described herein, may be executed on one or more computer systems, which may interact with various other devices. One such computer system is illustrated by FIG. 5. In the illustrated embodiment, computer system 500 includes one or more processors 510 coupled to a system memory 520. Computer system 500 further includes a network interface 570 and one or more input/output devices 540/550, such as a cursor control device, keyboard, audio device and display device 550. In some embodiments, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments, processors 510 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 510 may commonly, but not necessarily, implement the same ISA.

System memory 520 may be configured to store program instructions 530 and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for image editor 170 and network-based server 110, are shown stored within system memory 520 as program instructions 530 and data storage 560, respectively. In other embodiments, program instructions and/or data may be received, sent or stored upon different types of computer-accessible media or on similar media separate from system memory 520 or computer system 500. Generally speaking, a computer-accessible medium may include storage media or memory media such as magnetic or optical media, e.g., disk or Digital Versatile Disc (DVD) Read Only Memory (ROM)/Compact Disk-Read Only Memory (CD-ROM) coupled to computer system 500. Program instructions and data stored via a computer-accessible medium may be transmitted by transmission media or signals such as electrical, electromagnetic, or digital signals, which may be provided via a communication medium such as a network and/or a wireless link, such as may be implemented via network interface 570.

Network interface 570 may be configured to allow data to be exchanged between computer system 500 and other devices attached to a network, such as other computer systems, or between nodes of computer system 500. In various embodiments, network interface 570 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 540 and 550 respectively, may in some embodiments include one or more display terminals, keyboards, keypads, touchpads, scanning devices, voice or optical recognition devices, or any other devices suitable for entering or retrieving data by one or more computer system 500. Multiple input/output devices 540 and 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 570.

Memory 520 may include program instructions 530, configured to implement at least a portion of embodiments of the image editor 170 and network-based server 110 as described herein, and data storage 560, comprising various documents, tables, databases, etc. accessible by program instructions 530. In one embodiment, program instructions 530 may include software elements of the image editor 170 and network-based server 110 illustrated in the Figures, and data storage 560 may include data used in embodiments of image editor 170 and network-based server 110. In other embodiments, different software elements and data may be included. Program instructions and/or data may be stored, for example, on various types of memory including hard disks.

Those skilled in the art will appreciate that computer system 500 is merely illustrative and is not intended to limit the scope of client system 160 and network-based server 110 as described herein. In particular, the computer system and devices may include any combination of hardware or software that can perform the indicated functions, including computers, network devices, internet appliances, PDAs, mobile phones, pagers, etc. Computer system 500 may also be connected to other devices that are not illustrated, or instead may operate as a stand-alone system. In addition, the functionality provided by the illustrated client system 160 and network-based server 110 may in some embodiments be combined in fewer image-editing components or distributed in additional image-editing components. Similarly, in some embodiments, the functionality of some of the illustrated image-editing components 170 and network-based server 110 may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the image editor components 170 and network-based server 110 components may execute in memory on another device and communicate with the illustrated computer system via inter-computer communication. Some or all of the image editor 170 and network-based server 110 or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer-accessible medium. Accordingly, embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc. as well as transmission media or signals such as electrical, electromagnetic, or digital signals, provided via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

The invention claimed is:

1. A computer-implemented method, comprising:
receiving, at a computing device, a copy of an original image for editing with an image editor invoked within a web browser;
transforming, by the computing device, the received image into an updated image according to received input, wherein the transforming comprises performing one or more transformation operations on the received image;
generating an edit list identifying the received image and comprising: the one or more transformation operations performed on the received image, values indicating the order in which the one or more transformation operations were performed, a description of the performed transformation operations, and parameters corresponding to the performed transformation operations, wherein the edit list does not include the updated image; and
sending the edit list to a server, wherein when the edit list is received, the edit list facilitates scheduling the one or more transformation operations for the original image.

2. The computer-implemented method of claim 1, further comprising:
prior to the receiving:
requesting a page from a web server, wherein the image editor is embedded within the page; and
in response to receiving the page, invoking the embedded image editor.

3. The computer-implemented method of claim 1, further comprising:
prior to the transforming:
displaying a group of thumbnail images, each thumbnail image in the group of thumbnail images respectively corresponding to a particular transformation adjustment value; and
determining each transformation adjustment value of the one or more transformation operations based on a respective selection of one of the group of thumbnail images.

4. The computer-implemented method of claim 3, wherein the receiving comprises receiving the image from a digital camera, and wherein the computing device is a mobile computing device.

5. A system, comprising:
a processor;
a memory having instructions stored thereon that, if executed by the processor, cause the processor to:
receive a copy of an original image for editing with an image editor invoked within a web browser;
transform the received image into an updated image according to received input by performing one or more transformation operations on the received image;
generate an edit list identifying the received image and comprising: the one or more transformation operations performed on the received image, values indicating the order in which the one or more transformation operations were performed, a description of the performed transformation operations, and parameters corresponding to the performed transformation operations, wherein the edit list does not include the updated image; and
send the edit list to a server, wherein when the edit list is received, the edit list facilitates scheduling the one or more transformation operations for the original image.

6. The system of claim 5, the memory having instructions stored thereon that, if executed by the processor prior to execution of the instructions to receive the image, cause the processor to:
request a page from a web server, wherein the image editor is embedded within the page; and
in response to receiving the page, invoke the embedded image editor.

7. The system of claim 5, the memory having instructions stored thereon that, if executed by the processor prior to execution of the instructions to transform the image, cause the processor to:
display a group of thumbnail images, each thumbnail image in the group of thumbnail images respectively corresponding to a particular transformation adjustment value; and
determine each transformation adjustment value of the one or more transformation operations based on a respective selection of one of the group of thumbnail images.

8. The system of claim 5, wherein the received image is received from a digital camera, and wherein the processor and the memory are embodied within a mobile device.

9. A non-transitory computer-readable storage medium having instructions stored thereon, that when executed by a computing device cause the computing device to perform operations comprising:
receiving a copy of an original image for editing with an image editor;
transforming the received image into an updated image according to received input by performing one or more transformation operations on the received image;
generating an edit list identifying the received image and comprising: the one or more transformation operations performed on the received image, values indicating the order in which the one or more transformation operations were performed, a description of the performed transformation operations, and parameters corresponding to the performed transformation operations, wherein the edit list does not include the updated image; and
sending the edit list to a server, wherein when the edit list is received, the edit list facilitates scheduling the one or more transformation operations for the original image.

10. The non-transitory computer-readable storage medium of claim 9, the operations further comprising, prior to the receiving:
requesting a page from a web server, wherein the image editor is embedded within the page; and
in response to receiving the page, invoking the embedded image editor.

11. The non-transitory computer-readable storage medium of claim 9, the operations further comprising, prior to the transforming:
displaying a group of thumbnail images, each thumbnail image in the group of thumbnail images respectively corresponding to a particular transformation adjustment value; and
determining each transformation adjustment value of the one or more transformation operations based on a respective selection of one of the group of thumbnail images.

12. The non-transitory computer-readable storage medium of claim 9, wherein the receiving comprising receiving the image from a digital camera, and wherein the computing device is a mobile computing device.

13. A computer-implemented method, comprising:
receiving, at a computing device, from a client-side image editor, a request for an original image;
adjusting, by the computing device, one or more characteristics of a copy of the original image based on one or more limitations of the client-side editor;
sending the copy of the original image to the client-side editor;
receiving an edit list identifying the original image and comprising: one or more transformation operations to apply to the copy of the original image, values indicating the order in which the one or more transformation operations are to be applied, a description of the transformation operations to be performed, and parameters corresponding to the transformation operations to be applied, wherein the edit list does not include the copy of the original image, and wherein the edit list facilitates scheduling the one or more transformation operations for the original image;
determining one or more modifications to apply to at least some of the one or more transformations to account for the one or more characteristics of the copy of the original image that were adjusted; and
transforming the original image according to the one or more modifications as applied to the at least some of the one or more transformations, wherein the transforming produces a substantially similar effect on the original image as the unmodified one or more transformations would produce on the copy of the original image.

14. The computer-implemented method of claim 13, wherein a characteristic of the one or more characteristics is image resolution, and wherein the adjusting comprises downsampling the original image to create the copy of the original image.

15. The computer-implemented method of claim 13, wherein a characteristic of the one or more characteristics is image size, and wherein the adjusting comprises resizing the original image to create the copy of the original image that is smaller than the original image.

16. A system, comprising:
a processor;
a memory having instructions stored thereon that, if executed by the processor, cause the processor to:
receive, from a client-side image editor, a request for an original image;
adjust one or more characteristics of a copy of the original image based on one or more limitations of the client-side editor;
send the copy of the original image to the client-side editor;
receive an edit list identifying the original image and comprising: one or more transformation operations to apply to the copy of the original image, values indicating the order in which the one or more transformation operations are to be applied, a description of the transformation operations to be applied, and parameters corresponding to the transformation operations to be applied, wherein the edit list does not include the copy of the original image, and wherein the edit list facilitates scheduling the one or more transformation operations for the original image;
determine one or more modifications to apply to at least some of the one or more transformations to account for the one or more characteristics of the copy of the original image that were adjusted; and
transform the original image according to the one or more modifications as applied to the at least some of the one or more transformations, by producing a substantially similar effect on the original image as the unmodified one or more transformations would produce on the copy of the original image.

17. The system of claim 16, wherein a characteristic of the one or more characteristics is image resolution, and wherein to adjust the one or more characteristics comprises downsampling the original image to create the copy of the original image.

18. The system of claim 16, wherein a characteristic of the one or more characteristics is image size, and wherein to adjust the one or more characteristics comprises resizing the original image to create the copy of the original image that is smaller than the original image.

19. A non-transitory computer-readable storage medium having instructions stored thereon, that when executed by a computing device cause the computing device to perform operations comprising:
  receiving, from a client-side image editor, a request for an original image;
  adjusting one or more characteristics of a copy of the original image based on one or more limitations of the client-side editor;
  sending the copy of the original image to the client-side editor;
  receiving an edit list identifying the original image and comprising: one or more transformation operations to apply to the copy of the original image, values indicating the order in which the one or more transformation operations are to be applied, a description of the transformation operations to be applied, and parameters corresponding to the transformation operations to be applied, wherein the edit list does not include the copy of the original image, and wherein the edit list facilitates scheduling the one or more transformation operations for the original image;
  determining one or more modifications to apply to at least some of the one or more transformations to account for the one or more characteristics of the copy of the original image that were adjusted; and
  transforming the original image according to the one or more modifications as applied to the at least some of the one or more transformations, wherein the transforming produces a substantially similar effect on the original image as the unmodified one or more transformations would produce on the copy of the original image.

20. The non-transitory computer-readable storage medium of claim 19, wherein a characteristic of the one or more characteristics is image resolution, and wherein the adjusting comprises downsampling the original image to create the copy of the original image.

* * * * *

UNITED STATES PATENT AND TRADEMARK OFFICE
CERTIFICATE OF CORRECTION

| | | |
|---|---|---|
| PATENT NO. | : 9,123,085 B2 | Page 1 of 1 |
| APPLICATION NO. | : 13/480307 | |
| DATED | : September 1, 2015 | |
| INVENTOR(S) | : Berger et al. | |

It is certified that error appears in the above-identified patent and that said Letters Patent is hereby corrected as shown below:

In the claims

Column 16, Claim 19, Lines 7-9

Delete "the edit list facilitates scheduling the one or more transformation operations for the original image"

Insert --scheduling is performed for the one or more transformation operations for the original image in response to receiving the edit list--

Signed and Sealed this
Fifteenth Day of March, 2016

Michelle K. Lee
*Director of the United States Patent and Trademark Office*